US009069735B2

(12) United States Patent
Bourke et al.

(10) Patent No.: US 9,069,735 B2
(45) Date of Patent: *Jun. 30, 2015

(54) SYSTEMS AND METHODS FOR INTEGRATED APPLICATION PLATFORMS

(71) Applicant: SWEETLABS, INC., San Diego, CA (US)

(72) Inventors: Adrian Bourke, San Diego, CA (US); Bryan Sleiter, San Diego, CA (US); Fontaine H. Shu, San Diego, CA (US); Blake A. Machado, Coronado, CA (US); Pawel Miskiewicz, Victoria (CA)

(73) Assignee: SWEETLABS, INC., San Diego, CA (US)

(*) Notice: Subject to any disclaimer, the term of this patent is extended or adjusted under 35 U.S.C. 154(b) by 0 days.
This patent is subject to a terminal disclaimer.

(21) Appl. No.: 13/838,716

(22) Filed: Mar. 15, 2013

(65) Prior Publication Data
US 2014/0108912 A1   Apr. 17, 2014

Related U.S. Application Data

(60) Provisional application No. 61/714,217, filed on Oct. 15, 2012.

(51) Int. Cl.
G06F 17/27   (2006.01)
G06F 17/22   (2006.01)
(Continued)

(52) U.S. Cl.
CPC .......... *G06F 17/2247* (2013.01); *G06F 9/4443* (2013.01); *G06F 9/455* (2013.01); *G06F 17/30893* (2013.01); *G06F 9/45508* (2013.01)

(58) Field of Classification Search
CPC ....... G06F 9/45504; G06F 21/53; G06F 8/76; G06F 9/44526; G06F 17/211; G06F 17/227; G06F 17/2229; G06F 17/2247; G06F 17/4443; G06F 17/455; G06F 17/30893; G06F 17/45508
USPC ......... 715/234, 239, 243, 248, 760, 763, 765, 715/767, 808
See application file for complete search history.

(56) References Cited

U.S. PATENT DOCUMENTS 5,916,310 A   6/1999 McCain
6,018,343 A * 1/2000 Wang et al. .............. 715/733
(Continued)

FOREIGN PATENT DOCUMENTS

CN   1322325 A    11/2001
WO   2006120280 A1  11/2006
(Continued)

OTHER PUBLICATIONS

How to Use the Remote Shutdown Tool to Shut Down and Restart a Computer in Windows 2000, published: Jul. 5, 2006, pp. 1-2, http://support.microsoft.com/kb/317371.*
(Continued)

*Primary Examiner* — Wilson Tsui
(74) *Attorney, Agent, or Firm* — KPPB LLP

(57) ABSTRACT

Systems and methods for integrated application platforms in accordance with embodiments of the invention are disclosed. In one embodiment, a computing device configured to execute an application platform application includes a processor, an operating system configuring the processor to create a computing environment, the application platform application at least partially natively implemented and creates an application runtime environment for cross-platform applications to execute non-natively, the application platform application including a rendering engine process configured to render pages by interpreting instructions and implement a virtual machine configured to execute instructions and an integration process that enables instructions executing within the virtual machine to launch natively implemented applications wherein the application platform application includes a pop up page file containing instructions written in the rendering language that cause the rendering engine process to render a pop up page and wherein the application platform application is configured to launch a natively implemented application.

21 Claims, 8 Drawing Sheets

(51) Int. Cl.
　　*G06F 9/44* (2006.01)
　　*G06F 9/455* (2006.01)
　　*G06F 17/30* (2006.01)

(56) References Cited

U.S. PATENT DOCUMENTS

| | | | |
|---|---|---|---|
| 6,094,671 A | 7/2000 | Chase et al. | |
| 6,216,141 B1 | 4/2001 | Straub et al. | |
| 6,327,628 B1 | 12/2001 | Anuff et al. | |
| 6,456,307 B1 | 9/2002 | Bates et al. | |
| 6,697,838 B1 | 2/2004 | Jakobson | |
| 6,718,516 B1 | 4/2004 | Claussen et al. | |
| 6,810,410 B1 | 10/2004 | Durham | |
| 6,909,992 B2 | 6/2005 | Ashley | |
| 6,981,212 B1 | 12/2005 | Claussen | |
| 6,992,589 B2 | 1/2006 | Marsh | |
| 7,051,288 B2 * | 5/2006 | Bennett et al. | 715/781 |
| 7,207,000 B1 | 4/2007 | Shen et al. | |
| 7,272,786 B1 | 9/2007 | McCullough | |
| 7,401,325 B2 | 7/2008 | Backhouse et al. | |
| 7,614,018 B1 | 11/2009 | Ohazama et al. | |
| 7,636,683 B1 | 12/2009 | Mills et al. | |
| 7,681,134 B1 * | 3/2010 | Grechishkin et al. | 715/740 |
| 7,734,583 B2 * | 6/2010 | Vitanov et al. | 707/621 |
| 7,925,988 B2 | 4/2011 | Abernethy, Jr. et al. | |
| 7,950,026 B1 | 5/2011 | Urbach | |
| 7,996,785 B2 | 8/2011 | Neil | |
| 8,046,672 B2 | 10/2011 | Hegde et al. | |
| 8,176,321 B1 | 5/2012 | Perry et al. | |
| 8,209,598 B1 | 6/2012 | Pandey | |
| 8,260,845 B1 | 9/2012 | Colton et al. | |
| 8,296,643 B1 | 10/2012 | Vasilik | |
| 8,296,684 B2 | 10/2012 | Duarte et al. | |
| 8,335,817 B1 | 12/2012 | Dayan | |
| 8,346,222 B2 | 1/2013 | Zubas et al. | |
| 8,429,546 B2 | 4/2013 | Hilerio et al. | |
| 8,434,135 B2 | 4/2013 | Hilerio et al. | |
| 8,453,065 B2 * | 5/2013 | Chaudhri et al. | 715/762 |
| 8,458,612 B2 * | 6/2013 | Chatterjee et al. | 715/779 |
| 8,555,155 B2 | 10/2013 | Harrison et al. | |
| 8,566,697 B2 | 10/2013 | Meredith et al. | |
| 8,775,275 B1 | 7/2014 | Pope | |
| 8,775,917 B2 | 7/2014 | Bourke et al. | |
| 8,775,925 B2 | 7/2014 | Bourke et al. | |
| 8,799,771 B2 | 8/2014 | Bourke et al. | |
| 8,806,333 B2 | 8/2014 | Bourke et al. | |
| 2004/0081310 A1 | 4/2004 | Lueckhoff | |
| 2004/0177327 A1 | 9/2004 | Kieffer | |
| 2004/0205531 A1 | 10/2004 | Innes | |
| 2004/0221170 A1 | 11/2004 | Colvin | |
| 2004/0268225 A1 | 12/2004 | Walsh et al. | |
| 2005/0005234 A1 | 1/2005 | Chen | |
| 2005/0102374 A1 | 5/2005 | Moragne et al. | |
| 2005/0108678 A1 | 5/2005 | Goodwin et al. | |
| 2005/0210412 A1 | 9/2005 | Matthews | |
| 2006/0005187 A1 | 1/2006 | Neil | |
| 2006/0026438 A1 | 2/2006 | Stern | |
| 2006/0059422 A1 | 3/2006 | Wu et al. | |
| 2006/0161631 A1 | 7/2006 | Lira | |
| 2006/0224989 A1 | 10/2006 | Pettiross et al. | |
| 2006/0265280 A1 | 11/2006 | Nakada et al. | |
| 2007/0050777 A1 | 3/2007 | Hutchinson et al. | |
| 2007/0255814 A1 | 11/2007 | Green et al. | |
| 2007/0277109 A1 | 11/2007 | Chen et al. | |
| 2008/0021696 A1 | 1/2008 | Bartelt et al. | |
| 2008/0040226 A1 | 2/2008 | Roker | |
| 2008/0082565 A1 | 4/2008 | Chang et al. | |
| 2008/0108333 A1 | 5/2008 | Jemison et al. | |
| 2008/0140529 A1 | 6/2008 | Agarwal et al. | |
| 2008/0154718 A1 | 6/2008 | Flake et al. | |
| 2008/0172736 A1 | 7/2008 | Barr et al. | |
| 2008/0208589 A1 | 8/2008 | Cross et al. | |
| 2008/0256636 A1 | 10/2008 | Gassoway | |
| 2009/0019371 A1 | 1/2009 | Audet | |
| 2009/0019436 A1 | 1/2009 | Hartz et al. | |
| 2009/0070228 A1 | 3/2009 | Ronen | |
| 2009/0077174 A1 | 3/2009 | Janssen et al. | |
| 2009/0125833 A1 | 5/2009 | Abernethy et al. | |
| 2009/0132556 A1 | 5/2009 | Gupta et al. | |
| 2009/0171974 A1 | 7/2009 | Arthursson et al. | |
| 2009/0171993 A1 | 7/2009 | Arthursson | |
| 2009/0187928 A1 | 7/2009 | Mark | |
| 2009/0217179 A1 | 8/2009 | Mons et al. | |
| 2009/0249188 A1 | 10/2009 | Dube et al. | |
| 2009/0249238 A1 | 10/2009 | Chudy et al. | |
| 2009/0271394 A1 | 10/2009 | Allen et al. | |
| 2009/0282333 A1 | 11/2009 | Olsen et al. | |
| 2010/0017701 A1 | 1/2010 | Bargeron | |
| 2010/0023884 A1 | 1/2010 | Brichford et al. | |
| 2010/0054128 A1 | 3/2010 | O'Hern | |
| 2010/0114887 A1 | 5/2010 | Conway et al. | |
| 2010/0146529 A1 | 6/2010 | Heath et al. | |
| 2010/0205523 A1 | 8/2010 | Lehota et al. | |
| 2010/0211906 A1 | 8/2010 | Kanai | |
| 2010/0228594 A1 | 9/2010 | Chweh et al. | |
| 2010/0306762 A1 | 12/2010 | Lindberg et al. | |
| 2011/0016169 A1 | 1/2011 | Cahill et al. | |
| 2011/0055005 A1 | 3/2011 | Lang | |
| 2011/0093900 A1 | 4/2011 | Patel et al. | |
| 2011/0138295 A1 | 6/2011 | Momchilov et al. | |
| 2011/0138314 A1 | 6/2011 | Mir et al. | |
| 2011/0153806 A1 | 6/2011 | Bagasra | |
| 2011/0173098 A1 | 7/2011 | Lee | |
| 2011/0289422 A1 | 11/2011 | Spivack et al. | |
| 2011/0307738 A1 | 12/2011 | Hilerio et al. | |
| 2011/0307880 A1 | 12/2011 | Hilerio et al. | |
| 2011/0307883 A1 | 12/2011 | Hilerio et al. | |
| 2011/0307946 A1 | 12/2011 | Hilerio et al. | |
| 2011/0314389 A1 | 12/2011 | Meredith et al. | |
| 2012/0005346 A1 | 1/2012 | Burckart | |
| 2012/0030617 A1 | 2/2012 | Louch | |
| 2012/0047442 A1 | 2/2012 | Nicolaou et al. | |
| 2012/0066583 A1 | 3/2012 | Priestley et al. | |
| 2012/0066634 A1 | 3/2012 | Kim et al. | |
| 2012/0084713 A1 | 4/2012 | Desai et al. | |
| 2012/0096396 A1 | 4/2012 | Ording et al. | |
| 2012/0150963 A1 | 6/2012 | Horowitz et al. | |
| 2012/0151368 A1 | 6/2012 | Tam | |
| 2012/0166956 A1 | 6/2012 | Hilerio et al. | |
| 2012/0166959 A1 | 6/2012 | Hilerio et al. | |
| 2012/0173312 A1 | 7/2012 | Kern | |
| 2012/0174075 A1 | 7/2012 | Carteri et al. | |
| 2012/0233243 A1 | 9/2012 | Ashkenazy et al. | |
| 2012/0235912 A1 | 9/2012 | Laubach | |
| 2012/0266186 A1 | 10/2012 | Parzygnat | |
| 2012/0278127 A1 | 11/2012 | Kirakosyan et al. | |
| 2012/0290919 A1 | 11/2012 | Melnyk et al. | |
| 2012/0296959 A1 | 11/2012 | Momchilov et al. | |
| 2012/0297291 A1 | 11/2012 | Fainberg et al. | |
| 2012/0297377 A1 | 11/2012 | Chen et al. | |
| 2012/0311419 A1 | 12/2012 | Kwak et al. | |
| 2012/0324338 A1 | 12/2012 | Meredith et al. | |
| 2013/0024763 A1 | 1/2013 | Nemati et al. | |
| 2013/0073401 A1 | 3/2013 | Cook | |
| 2013/0111341 A1 | 5/2013 | Bier | |
| 2013/0124211 A1 | 5/2013 | McDonough | |
| 2013/0124557 A1 | 5/2013 | Goode et al. | |
| 2013/0145348 A1 | 6/2013 | Agovic et al. | |
| 2013/0173319 A1 | 7/2013 | Thomas et al. | |
| 2013/0197972 A1 | 8/2013 | Taguchi et al. | |
| 2013/0246906 A1 | 9/2013 | Hamon | |
| 2013/0262168 A1 | 10/2013 | Makanawala et al. | |
| 2013/0268837 A1 | 10/2013 | Braithwaite | |
| 2013/0290879 A1 | 10/2013 | Greisson | |
| 2013/0304581 A1 | 11/2013 | Soroca et al. | |
| 2014/0053107 A1 | 2/2014 | Patel | |
| 2014/0236756 A1 | 8/2014 | Bourke et al. | |

FOREIGN PATENT DOCUMENTS

| | | | |
|---|---|---|---|
| WO | WO 2006120280 A1 * | 11/2006 | |

(56) References Cited

FOREIGN PATENT DOCUMENTS

| | | |
|---|---|---|
| WO | 2011160139 A1 | 12/2011 |
| WO | 2013074713 A1 | 5/2013 |

OTHER PUBLICATIONS

Mikkonen et al., "Towards a Uniform Web Application Platform for Desktop Computers and Mobile Devices", ACM, 2008, pp. 1-29.
International Search Report and Written Opinion for International Application No. PCT/US2012/65136, International Filing Date Nov. 14, 2012, Search Completed Jan. 29, 2013, Mailed Feb. 8, 2013, 7 pgs.
International Search Report and Written Opinion for International Application No. PCT/US2009/36069, date completed Jun. 23, 2009, date mailed Jul. 7, 2009, 8 pgs.
International Search Report and Written Opinion for International Application PCT/US2011/041129, Report completed Sep. 22, 2011; 15 pgs.
Laufer, "A Hike through Post-EJB J2EE Web Application Architecture", IEEE, 2005, pp. 80-88.
Lee, et al., "Integrating Service Composition Flow with User Interactions", IEEE, 2008, pp. 103-108.
Mikkonen, et al., "Towards a Uniform Web Application Platform for Desktop Computers and Mobile Devices", ACM, 2008, pp. 1-29.
Stearn, "XULRunner: A New Approach for Developing Rich Internet Applications", IEEE, 2007, pp. 67-73.
Sugawara, et al., "A Novel Intuitive GUI Method for User-friendly Operation", Google 2009, pp. 235-246.
International Search Report and Written Opinion for International Application No. PCT/US13/52042, International Filing Date Jul. 25, 2013, Search Completed Dec. 13, 2013, Mailed Dec. 23, 2013, 12 pgs.
"How to Use the Remote Shutdown Tool to Shut Down and Restart a computer in Windows 2000," published Jul. 5, 2006, pp. 1-2, printed from http://support.microsoft.com/kb/317371.
International Search Report and Written Opinion for International Application No. PCT/US2013/052562, International Filing Date Jul. 29, 2013, Search Completed Jan. 30, 2014, Mailed Feb. 7, 2014, 5 pgs.
International Search Report and Written Opinion for International Application No. PCT/US2013/052861, International Filing Date Jul. 31, 2013, Search Completed Jan. 29, 2014, Mailed Feb. 21, 2014, 8 pgs.
International Search Report and Written Opinion for International Application No. PCT/US2013/057087, International Filing Date Aug. 28, 2013, Search Completed Feb. 27, 2014, Mailed Mar. 19, 2014, 10 pgs.
Heino et al., "Developing Semantic Web Applications with the OntoWiki Framework," Springer 2009, pp. 61-77.
Oren, "SemperWiki: A Semantic Personal Wiki," Google 2005, pp. 1-16.
Sen et al., "Feed Me: A Collaboration Alert Filtering System," ACM 2006, pp. 89-98.

\* cited by examiner

SYSTEMS AND METHODS FOR INTEGRATED APPLICATION PLATFORMS

CROSS REFERENCE TO RELATED APPLICATIONS

The present invention claims priority under 35 U.S.C. §119 (e) to U.S. Provisional Patent Application Ser. No. 61/714,217 entitled "Systems and Methods for Integrated Application Platforms", filed Oct. 15, 2012, the disclosure of which is herein incorporated by reference in its entirety.

FIELD OF THE INVENTION

The present invention is generally related to software applications and more specifically to integrated application platforms that manage local computing device functions and/or configurations as well as natively and non-natively implemented applications.

BACKGROUND

A runtime environment can enable an application to be integrated into the computing environment of a computing device. Typically, a runtime environment is provided for applications to be implemented natively (i.e. compiled into the machine code of the computing device on which it resides) on a computing device by an operating system. However, other runtime environments can be provided for applications to be implemented non-natively on a computing device, such as web applications that can operate within a virtual machine provided by a web browser that operates natively on a computing device.

A web browser is an application that typically retrieves and presents information found on web pages maintained by content servers over a network. A web page is typically stored as one or more text files formatted in browser supported formats such as but not limited to markup languages (such as but not limited to HyperText Markup Language (HTML) as defined by the World Wide Web Consortium), scripts (such as but not limited to JavaScript and/or other scripts that incorporate ECMAScript as defined by the ECMA TC-39 committee of the Mozilla Foundation) and style sheets (such as but not limited to cascading style sheets (CSS) as defined by the World Wide Web Consortium) that can be displayed by a web browser.

SUMMARY OF THE INVENTION

Systems and methods for integrated application platforms in accordance with embodiments of the invention are disclosed. In one embodiment, a computing device configured to execute an application platform application includes a processor, storage, an operating system stored within the storage, where the operating system configures the processor to create a computing environment, the application platform application stored in the storage, where the application platform application is at least partially natively implemented and creates an application runtime environment for cross-platform applications to execute non-natively on the computing device when executed within the computing environment by the computing device, the application platform application including a rendering engine process configured to render pages within the computing environment created by the operating system by interpreting instructions written in a rendering language and implement a virtual machine configured to execute instructions written in a scripting language and an integration process that enables instructions executing within the virtual machine to launch natively implemented applications within the computing environment wherein the application platform application includes a pop up page file containing instructions written in the rendering language that cause the rendering engine process to render a pop up page within the computing environment of the computing device and wherein the application platform application is configured to launch a natively implemented application using the integration layer in response to a user instruction received via interaction with the rendered pop up page.

In another embodiment of the invention, the integration process enables instructions executing within the virtual machine to retrieve information from the computing environment of the computing device, the application platform application is configured to retrieve information from the computing environment using the integration layer in response to a user instruction received via interaction with the rendered pop up page and the application platform application is configured to inject at least a portion of the retrieved information into the instructions written in the rendering language from the pop up page file and cause the rendering engine process to render the pop up page including the at least a portion of the retrieved information.

In an additional embodiment of the invention, the retrieved information includes at least one launch point for a specific natively implemented application and the application platform application is configured to launch the specific natively implemented application using the launch point and the integration layer in response to a user instruction received via interaction with the rendered pop up page.

In yet another additional embodiment of the invention, the integration process enables instructions executing within the virtual machine to retrieve information from the computing environment of the computing device by providing a query to a search engine within the computing environment.

In still another additional embodiment of the invention, the search engine is configured to perform a search for information within the storage of the computing device by generating an index of the storage of the computing device, querying the index using metadata that identifies information stored within the storage of the computing device, and retrieving the information stored within the storage of the computing device.

In yet still another additional embodiment of the invention, the instructions within the pop up page file further includes retrieving information from the application runtime environment that is displayed when the pop up page is rendered by the rendering engine process.

In yet another embodiment of the invention, the information from the application runtime environment includes at least one launch point for a cross-platform application and the application platform application is configured to launch a cross-platform application in response to a user instruction received via interaction with the rendered pop up page.

In still another embodiment of the invention, the natively implemented application launched by the application platform application is a file manager application that provides a user interface to access and navigate a system of files stored within the storage of the computing device.

In yet still another embodiment of the invention, the natively implemented application launched by the application platform application is an application that invokes a shutdown process that instructs the computing device's power management hardware to turn off power to the computing device after ending all executing processes running on the computing device.

Still another embodiment of the invention includes a method of executing an application platform application on a computing device including creating a computing environment using a processor configured by an operating system on the computing device and executing an application platform application within the computing environment to generate a runtime environment for cross-platform applications to execute non-natively on the computing device, the application platform application including a rendering engine process configured to render pages within the computing environment created by the operating system by interpreting instructions written in a rendering language and implement a virtual machine configured to execute instructions written in a scripting language and an integration process that enables instructions executing within the virtual machine to launch natively implemented applications within the computing environment, rendering instructions written in the rendering language contained within a pop up page file that is part of the application platform application to create a pop up page within the computing environment of the computing device using the rendering engine process, and launching a natively implemented application using the integration layer in response to a user instruction received via interaction with the rendered pop up page.

In yet another additional embodiment of the invention, the integration process enables instructions executing within the virtual machine to retrieve information from the computing environment of the computing device, and the method further includes retrieving information from the computing environment using the integration layer in response to a user instruction received via interaction with the rendered pop up page, and injecting at least a portion of the retrieved information into the instructions written in the rendering language from the pop up page file using the application platform application, and rendering the pop up page including the at least a portion of the retrieved information using the rendering engine process.

In still another additional embodiment of the invention, the retrieved information includes at least one launch point for a specific natively implemented application and the method further includes launching the specific natively implemented application using the launch point and the integration layer in response to a user instruction received via interaction with the rendered pop up page.

In yet still another additional embodiment of the invention, the integration process enables instructions executing within the virtual machine to retrieve information from the computing environment of the computing device by providing a query to a search engine within the computing environment.

In yet still another additional embodiment of the invention, where the method further includes searching for information within the storage of the computing device using the search engine by generating an index of the storage of the computing device, querying the index using metadata that identifies information stored within the storage of the computing device, and retrieving the information stored within the storage of the computing device.

In yet another embodiment of the invention, the method further includes retrieving information from the application runtime environment that is displayed when the pop up page is rendered by the rendering engine process by executing executable instructions within the pop up page file within the virtual machine.

In still another embodiment of the invention, the information from the application runtime environment includes at least one launch point for a cross-platform application and the method further includes launching a cross-platform application in response to a user instruction received via interaction with the rendered pop up page using the application platform application.

In yet still another embodiment of the invention, the natively implemented application launched by the application platform application is a file manager application that provides a user interface to access and navigate a system of files stored within the storage of the computing device.

In still another embodiment of the invention, the natively implemented application launched by the application platform application is an application that invokes a shutdown process that instructs the computing device's power management hardware to turn off power to the computing device after ending all executing processes running on the computing device.

Yet another embodiment of the invention includes a machine readable medium containing processor instructions, where execution of the instructions by a processor causes the processor to perform a process including creating a computing environment, and generating a runtime environment for cross-platform applications to execute non-natively, the application platform application including a rendering engine process configured to render pages within the computing environment created by the operating system by interpreting instructions written in a rendering language and implement a virtual machine configured to execute instructions written in a scripting language, and an integration process that enables instructions executing within the virtual machine to launch natively implemented applications within the computing environment, rendering instructions written in the rendering language contained within a pop up page file to create a pop up page within the computing environment using the rendering engine process, and launching a natively implemented application using the integration layer in response to a user instruction received via interaction with the rendered pop up page.

DETAILED DESCRIPTION

Figure 1:
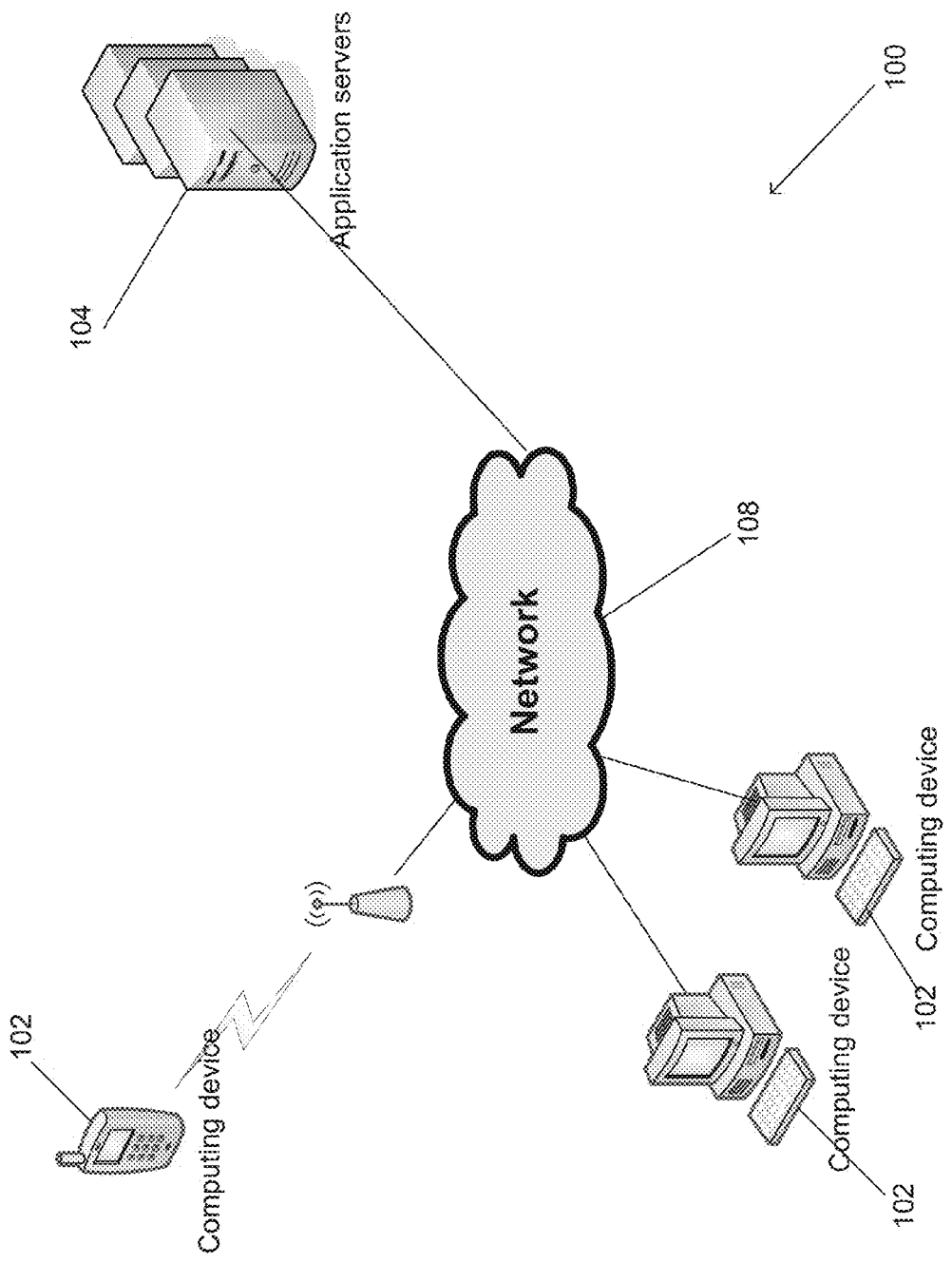
FIG. 1 is a network diagram illustrating computing devices configured by integrated application platforms to execute non-native applications in accordance with an embodiment of the invention.

Turning now to the drawings, systems and methods for configuring an integrated application platform application capable of providing launch points for both non-natively implemented applications executing within a runtime environment provided by the application platform application and natively implemented applications in accordance with embodiments of the invention are illustrated. Integrated application platforms in accordance with embodiments of the invention can manage user interaction with local computing device functions and/or configurations on which the application platform application resides, such as (but not limited to) shutting down the local computing device, changing the resolution of a display of the local computing device or accessing files or directories stored on the local computing device. Thereby, integrated application platforms can provide an alternative user interface from which a user can access the local computing device as well as native and non-natively implemented applications. Application platforms that create a runtime environment in which non-natively implemented applications can execute are discussed in U.S. application Ser. No. 13/164,740 filed Jun. 20, 2011 titled "Systems and Methods for Integration of an Application Runtime Environment into a User Computing Environment", the disclosure of which is hereby incorporated by reference in its entirety.

In numerous embodiments, an integrated application platform application includes a rendering engine layer and an integration layer. The rendering engine layer includes various parsers and virtual machines that can be utilized by a rendering engine process and associated with supporting specific web technologies including but not limited to HTML, JavaScript, and CSS. The integration layer exposes a number of application programming interfaces (API) that can be called by the application platform application itself or a non-native application executing in the computing environment of the integrated application platform application to make modifications to a user's computing environment or to call upon services from other applications. In several embodiments, the integration layer APIs are JavaScript APIs. In response to the API calls the integration layer can communicate with the operating system and/or natively implemented processes to modify the user's computing environment or call upon services from other applications.

In several embodiments, a runtime environment generated by an integrated application platform application is at least partially natively implemented and provides an intuitive user interface that is integrated with the computing environment of a device's operating system, which enables the user to access, organize and discover computing device functions and/or configurations, discover and launch non-native applications that can execute within the runtime environment created by the integrated application platform, and discover and launch native applications that can execute within the computing environment of the device's operating system. The runtime environment also provides mechanisms by which non-native applications can communicate with native processes including operating system processes. In several embodiments, an application platform application enables the integration of applications with the user's desktop computing environment through the utilization of launch points. From a launch point, such as but not limited to a menu, desktop icons, and/or taskbar icons, a user can access native or non-natively implemented applications and bring the user interface of the application (or even the integrated application platform application itself) to the foreground. An integrated application platform application can enable a user to access a launch point provided directly in the foreground or accessed from a hierarchical menu from which multiple launch points can be listed in an organized fashion. In numerous embodiments, a user interface for an integrated application platform application can be generated from a text file containing instructions in markup and/or scripting languages capable of being rendered by the rendering engine layer. The text file can integrate include calls to the integration layer that exposes at least one application programming interface configured to invoke processes performed within the computing environment of a device's operating system.

In several embodiments, integrated application platforms can discover and present in a single menu or menu hierarchy natively implemented and non-natively implemented applications as well as local computing device functions and/or configurations. In certain embodiments, these applications and local computing device functions and/or configurations can be presented as a list of launch points for applications or files, or as directories which contain launch points, files or subdirectories. These applications and local computing device functions and/or configurations can be found by an integrated application platform application utilizing existing directories of natively implemented applications present on the computing device (that may not have been installed via the integrated application platform application and do not utilize the integrated application platform application to execute) and local computing device functions and/or configurations that can be accessed and/or controlled via the operating system of the computing device. In particular embodiments, directories provided within the computing environment created by the operating system of the computing device include directories to natively implemented applications and local computing device functions and/or configurations. In certain embodiments, the operating system provides the capability of performing a search utilizing a local search engine API or by querying an index of the local computing device, which the integrated application platform application can utilize to obtain information concerning the natively implemented applications and/or files present on the computing device to build a user interface to enable a user to access the applications and/or files via the integrated application platform application and/or in response to a user query via the integrated application platform.

In many embodiments, integrated application platforms process information retrieved via operating system APIs to present the retrieved information in a more relevant or intuitive manner. In certain embodiments, the outputs of various search engine applications can be organized and presented according to related categories of information (such as but not limited to a program, file or directory), or by location (such as but not limited to on the Internet or within the local computing device).

In various embodiments, the user interface of an integrated application platform application can be customized according to user preferences. This customization can be manual, such as from a user or a third party choosing from various preferences for the user interface, or automatic such as from inferences made from a log of user activity.

Although various integrated application platforms are discussed above, integrated application platforms can be implemented in any manner to enable the discovery and launching of natively implemented applications on a computing device as appropriate to the requirements of a specific application in accordance with embodiments of the invention. Integrated application platforms in accordance with embodiments of the invention are discussed further below.

System Architecture

Integrated application platforms can be implemented on a local computing device where execution of the application platform application creates a runtime environment in which non-natively implemented applications can execute. Integrated application platforms can also present an intuitive user interface in which a user can interact with local computing device functions and/or configurations as well as discover and launch natively implemented and non-natively implemented applications. In certain embodiments, the local computing devices on which the application platform application can execute communicate via a network with application servers that provide information utilized during the execution of the non-natively implemented applications. In addition, the local computing device can download new non-natively implemented applications for execution within the runtime environment created by the application platform application from the application servers.

A network diagram illustrating local computing devices configured by integrated application platforms in accordance with an embodiment of the invention is illustrated in FIG. 1. The network 100 includes a number of local computing devices 102 connected to application servers 104 over a network 108 such as (but not limited to) the Internet. An integrated application platform application is installed on each local computing device 102. The execution of the integrated application platform application creates an application runtime environment on each local computing device 102 in which one or more non-native applications can be downloaded from an application server 104 and executed within the application runtime environment provided by each integrated application platform. Additionally, integrated application platforms can access, organize and discover local computing device functions and/or configurations and discover and launch natively implemented applications in addition to non-natively implemented applications. Thereby, integrated application platforms provide a single integrated user interface to enable a user to access local computing device functions and/or configurations, control local computing device configurations, access local files and natively implemented applications and to discover and launch non-natively implemented applications within the runtime environment created by the integrated application platform.

Although specific systems that utilize integrated application platforms are discussed above, systems that can be configured using integrated application platforms can be implemented in any manner as appropriate to the requirements of a specific application in accordance with embodiments of the invention. Processes for accessing natively implemented applications and local device functions and/or configurations via an integrated application platform application in accordance with embodiments of the invention are described below.

Accessing Applications and Local Computing Device Functions and/or Configurations Integrated application platforms in accordance with many embodiments of the invention can access natively implemented and non-natively implemented applications as well as enable a user to control local computing device functions and/or configurations. These applications and local computing device functions and/or configurations can be discovered by using existing directories, such as directories used by the local computing device's operating system or by performing a search. In several embodiments, the user interface of the integrated application platform application enables the direct launch of natively implemented applications via launch points within the user interface or the indirect launch of the application via the selection of files via the user interface having types associated with a specific natively implemented application, which cause the launch of the natively implemented application in order to access the file.

In many embodiments, the operating system of a local computing device organizes applications, files and directory into directories. Integrated application platforms can utilize these existing directories to endow their own user interfaces with the ability to similarly present these applications, files or directories in conjunction with non-natively implemented applications installed on the computing device via the integrated application platform. In certain embodiments, the directory structure of a specific operating system is preprogrammed into the integrated application platform application specific to a local computing device and operating system combination. In particular embodiments, relevant directories can be found using a search of the local computing device, such as by using a local computing device search engine API.

Figure 2:
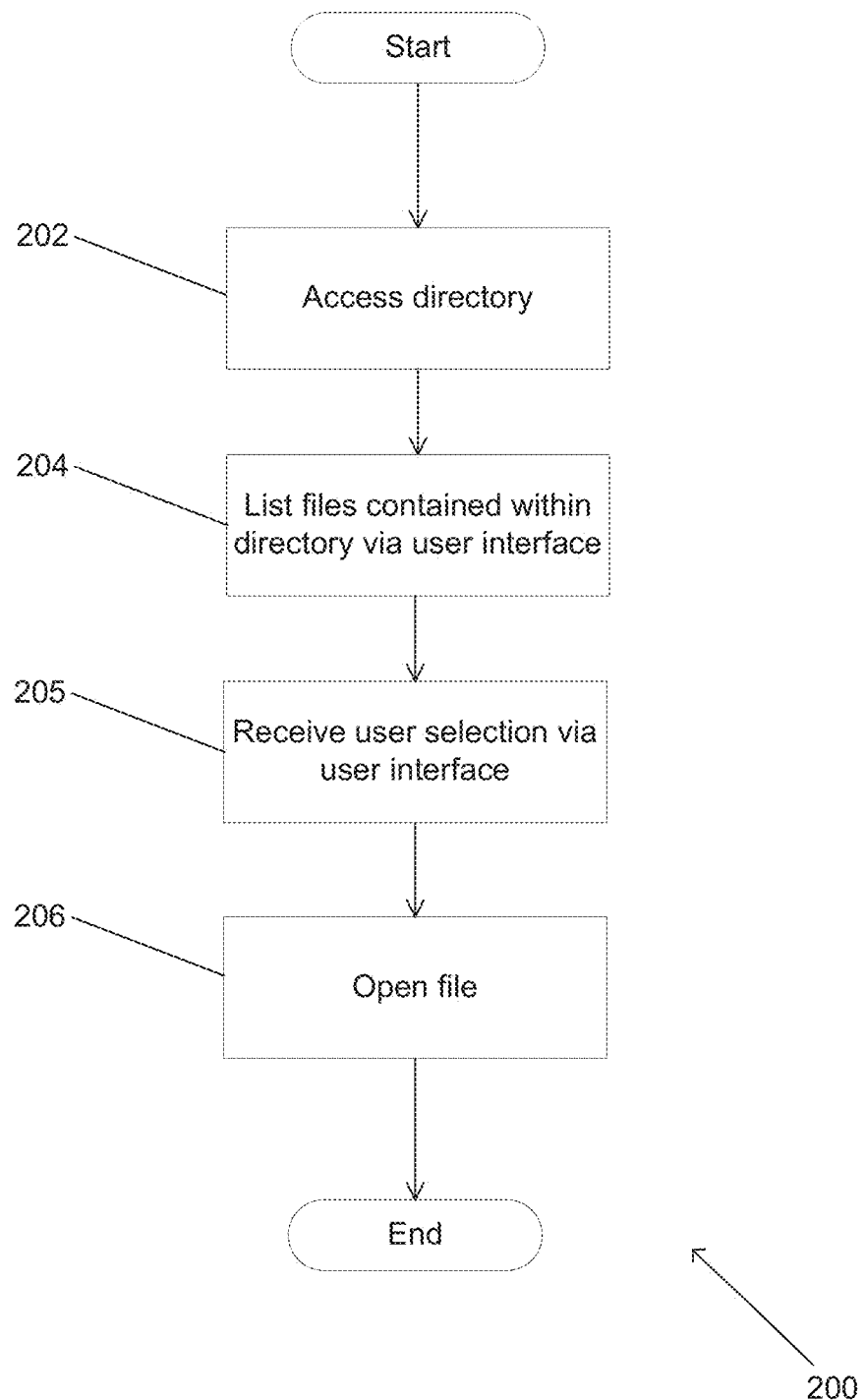
FIG. 2 is a flowchart illustrating a process for accessing a file from a directory in accordance with an embodiment of the invention.

A flowchart of a process for accessing files within the local computing device from one or more directories established by the operating system and known to the integrated application platform application to contain relevant files in accordance with an embodiment of the invention is illustrated in FIG. 2. The process 200 includes accessing (202) one or more relevant directories, listing (204) some or all of the files contained within the directories (in many instances filters are applied to the files and/or a hierarchy is established that may or may not be based on a directory hierarchy established by the operating system computing environment), receiving a selection of a file via the user interface, and opening (206) the selected file. In a number of instances, the files are executable files that enable the launch of applications and can have image files containing icons associated with them that are displayed via the user interface of the integrated application platform. In many embodiments, the files contain data and the integrated application platform application determines an association between the data file and a specific application (natively implemented and/or non-natively implemented) and launches an associated application to enable access to the data within the data file.

In several embodiments, integrated application platforms can utilize search techniques to discover and utilize local computing system functions and/or configurations as well as natively implemented and non-natively implemented applications, and/or locally stored data files. These searches can be performed by an application, such as a native or non-native application, through an API. An integrated application platform application can also perform its own search by walking through the directory structure of the local computing device on which the integrated application platform application is installed to create an index of the files stored on the local computing device that can be queried to retrieve a specific file or files. These indexes can be of any data structure that stores information that can be utilized by the integrated application platform application and/or non-natively implemented applications executing within the integrated application platform application to identify and locate files, such as but not limited to a lookup table, database index, and/or relational database. An index can be assembled based upon any kind of information, including but not limited to text found within files or file names as well as file extensions or metadata associated with files in the local computing device. In certain embodiments, the results from the search can be compiled into a list, such as a list of applications.

Figure 3:
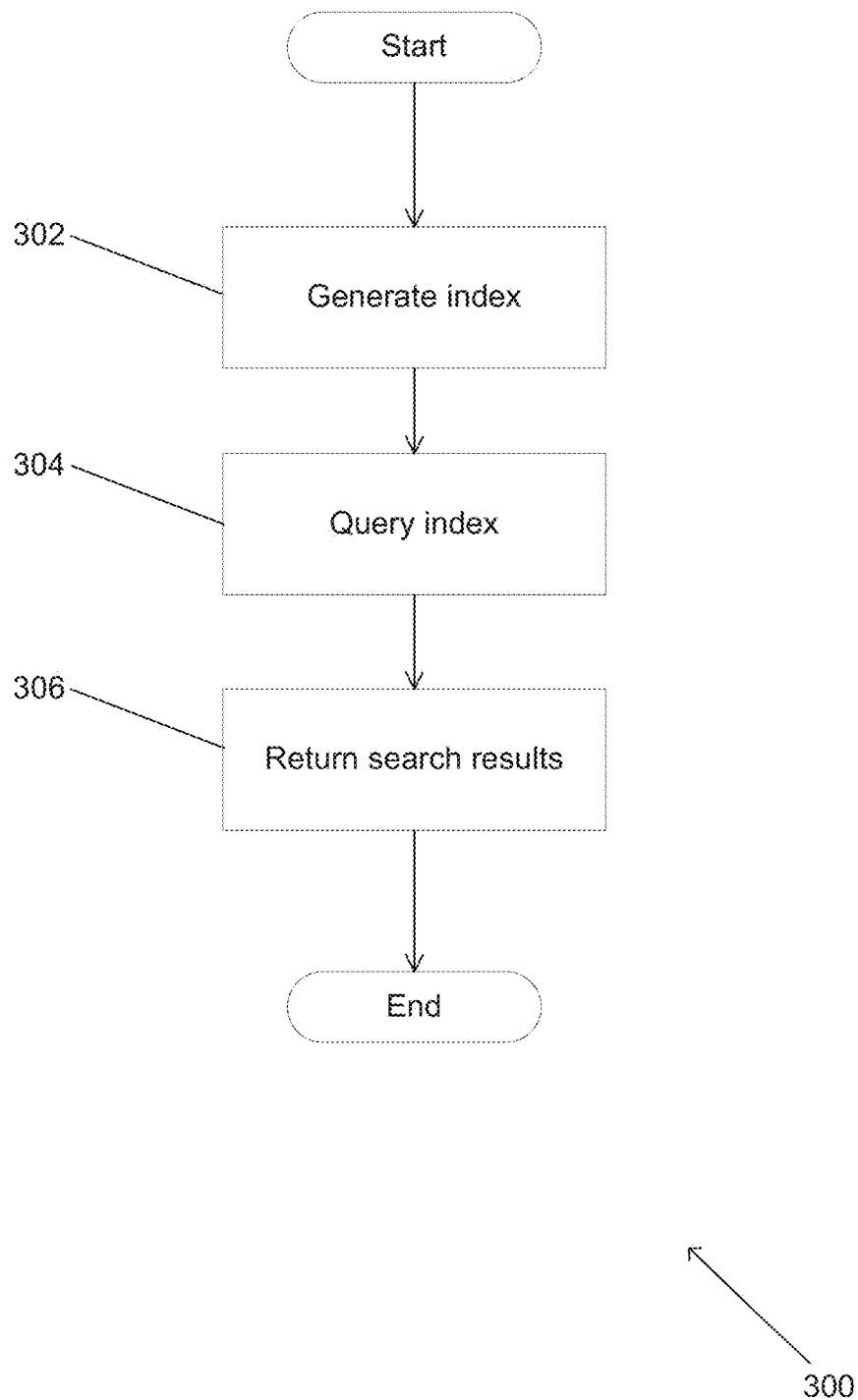
FIG. 3 is a flowchart illustrating a process for performing a search using an index generated by an integrated application platform application using data retrieved via operating system APIs in accordance with an embodiment of the invention.

A flowchart of a process performed by an integrated application platform application that searches for files stored on a local computing device using an API provided by the operating system of the local computing device in accordance with an embodiment of the invention is illustrated in FIG. 3. The process 300 includes generating (302) an index of the files stored on the local computing device by walking through a directory structure on a local computing device using calls to an API provided by the operating system of the local computing device to assemble information concerning the files contained stored on the local computing device. As noted above, the index can be assembled based upon any kind of information, including but not limited to text found within files or file names as well as file extensions or metadata associated with files in the local computing device. The index can be queried (304) by the integrated application platform application according to search criteria and the findings returned (306) via a user interface based upon the results of the query. In several embodiments, the integrated application platform application provides a user interface enabling a user to enter a search query. In a number of embodiments, non-natively implemented application can query the index. In several embodiments, the integrated application platform application queries the index to automatically generate various hierarchical menus (e.g. displaying files by file type: documents, music, pictures, programs or alphabetical listings of file names). In a variety of embodiments, an index of configuration options and functions of the local computing device is generated (302). In several embodiments, the generated (302) index includes data structures describing data provided by non-native applications that are running on a runtime provided by the integrated application platform. For example, if a non-native application provides access to data from a remote server system, the generated (302) index can include the data from the remote server system via the data received by the non-native application.

Although various configurations of integrated application platforms are discussed above, integrated application platforms can be configured to access applications or local computing device functions and/or configurations in any manner as appropriate to the requirements of a specific application in accordance with embodiments of the invention. Processes for configuring application output in accordance with embodiments of the invention are described below.

Processes for Integrating Information Retrieved from Various Sources for Display via a User Interface Generated by an Integrated Application Platform Application Integrated application platforms in accordance with many embodiments of the invention can present information retrieved via operating system APIs, such as outputs from a search application, in an intuitive or personalized fashion in a user interface. Application platforms can also utilize services from applications that execute natively on the local computing device or non-natively in the runtime environment provided by the integrated application platform application to retrieve information. The integrated application platform application can process the outputs from operating system API calls, a single application and/or several applications to provide intuitive and personalized results that can be displayed via the user interface of the integrated application platform. In addition to integrated information retrieved via operating system API calls and/or via application services into user interfaces such as (but not limited to) hierarchical menus, an integrated application platform application can also integrate information generated by the integrated application platform application itself into the user interface. In many embodiments, information generated by an integrated application platform application that can be integrated into a user interface with other information retrieved by the integrated application platform application includes (but is not limited to) information derived from a log of user activity stored by the integrated application platform.

Figure 4:
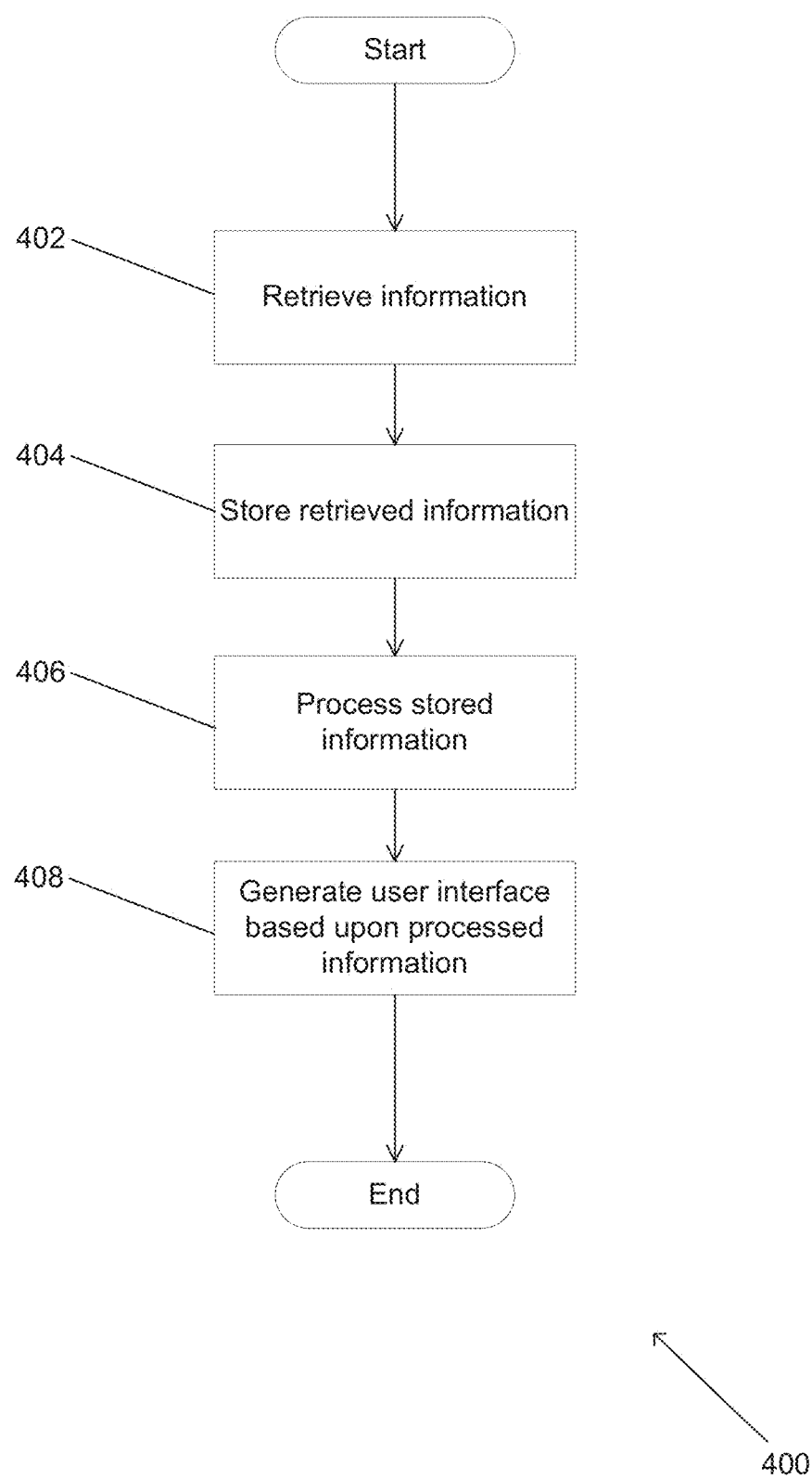
FIG. 4 is a flowchart illustrating a process for displaying information retrieved from a variety of sources including via operating system APIs using an integrated application platform application in accordance with an embodiment of the invention.

A flowchart of a process for displaying information integrated from a variety of sources including via operating system API calls by an integrated application platform application in accordance with an embodiment of the invention is illustrated in FIG. 4. The process 400 includes retrieving (402) information from a variety of sources including (but not limited to) via operating system API calls, using a service provided by an application, and/or information generated by the integrated application platform. The retrieved information can be stored (404) and processed (406) in order to enable the display (408) of the information in an intuitive and/or personalized fashion. In a number of embodiments, the processing involves filtering the retrieved information. In several embodiments, the filtering is performed based upon display preferences specified within a user profile.

In many embodiments, personalization can occur when a user manually indicates how an application output should be configured and the integrated application platform application can store and modify the user interface in light of the stored user preferences. In particular embodiments, an integrated application platform application can present personalized recommendations for applications (including, but not limited to, native and non-native applications) based upon the frequency of use of similar applications or by presenting an option to reiterate an activity derived from a log of user activity.

Although specific processes for configuring application outputs are discussed above, integrated application platforms can be configured in any manner as appropriate to the requirements of a specific application in accordance with embodiments of the invention. User interfaces that can be generated by integrated application platforms in accordance with embodiments of the invention are illustrated below.

User Interface

Figure 5:
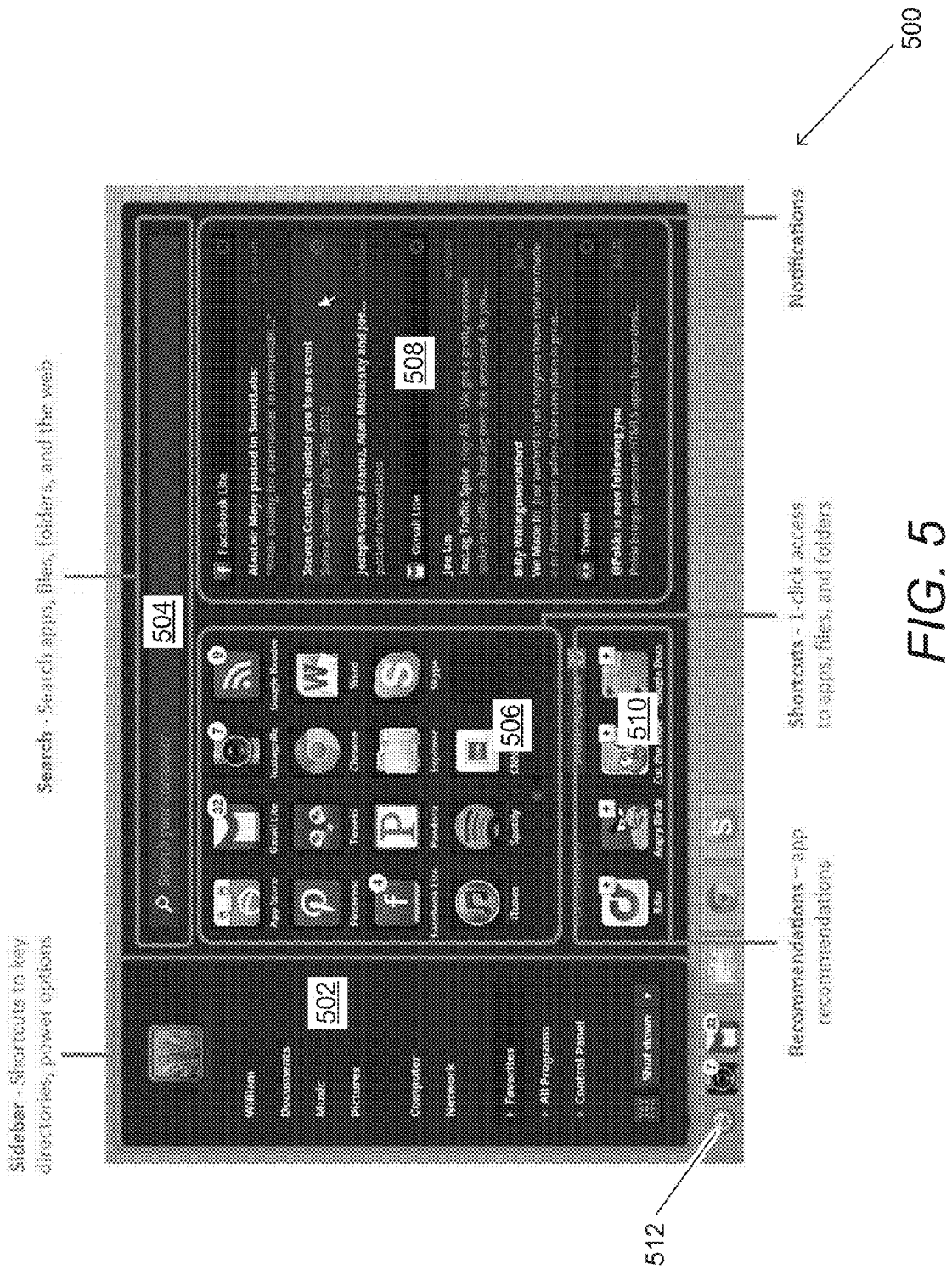
FIG. 5 is a screenshot of a user interface rendered by an application platform application in accordance with an embodiment of the invention.

Integrated application platforms in accordance with many embodiments of the invention can generate an intuitive user interface that a user can utilize to access local computing device functions and/or configurations as well as applications that can be executed natively or non-natively within the runtime environment provided by the integrated application platform. A screenshot of a general user interface rendered by an integrated application platform application in accordance with an embodiment of the invention is illustrated in FIG. 5. The screenshot 500 illustrates an integrated application platform's user interface brought to the foreground using a launch point 512 for the integrated application platform. The user interface includes regions in which a sidebar 502 provides a user access to popular directories of files such as documents, music, pictures, programs as well as local computing device functions and/or configurations labeled under a "Control Panel" interface or the ability to shut down the local computing device. The user interface also includes a universal search bar 504, notifications 508, shortcuts to applications 506 and application recommendations 510. In the illustrated embodiment, a variety of sources of information from non-natively implemented applications that execute within a runtime environment provided by the integrated application platform application include a listing of non-natively implemented applications and/or messages or alerts associated with specific non-natively implemented applications. The display of such information in user interfaces is discussed in detail within U.S. Provisional Patent Application Ser. No. 61/681, 547 entitled "Systems and Methods for Application Alert Management" filed Aug. 9, 2012, the disclosure of which is herein incorporated by reference in its entirety. As can readily be appreciated from the embodiment illustrated in FIG. 5, integrated application platforms in accordance with embodiments of the invention also incorporate information concerning natively implemented applications, files stored locally on a computing device, and/or local computing device functions and/or configurations.

In several embodiments, an integrated application platform application can generate a user interface from a text file containing instructions in markup and/or scripting languages capable of being rendered by the rendering engine layer. In a variety of embodiments, the rendering engine layer is configured to generate an object model using the instructions and render the user interface based on the generated object model. The text file can include calls to the integration layer that exposes at least one application programming interface configured to invoke processes performed within the computing environment of a device's operating system. These processes performed within the computing environment of a device's operating system can include, but is not limited to, the launch of native applications, executable instructions that control core hardware of the device (such as but not limited to a shut down process configured to shut down a device) and a file manager application that provides a user interface to access and navigate a system of files stored within the device.

Figure 6:
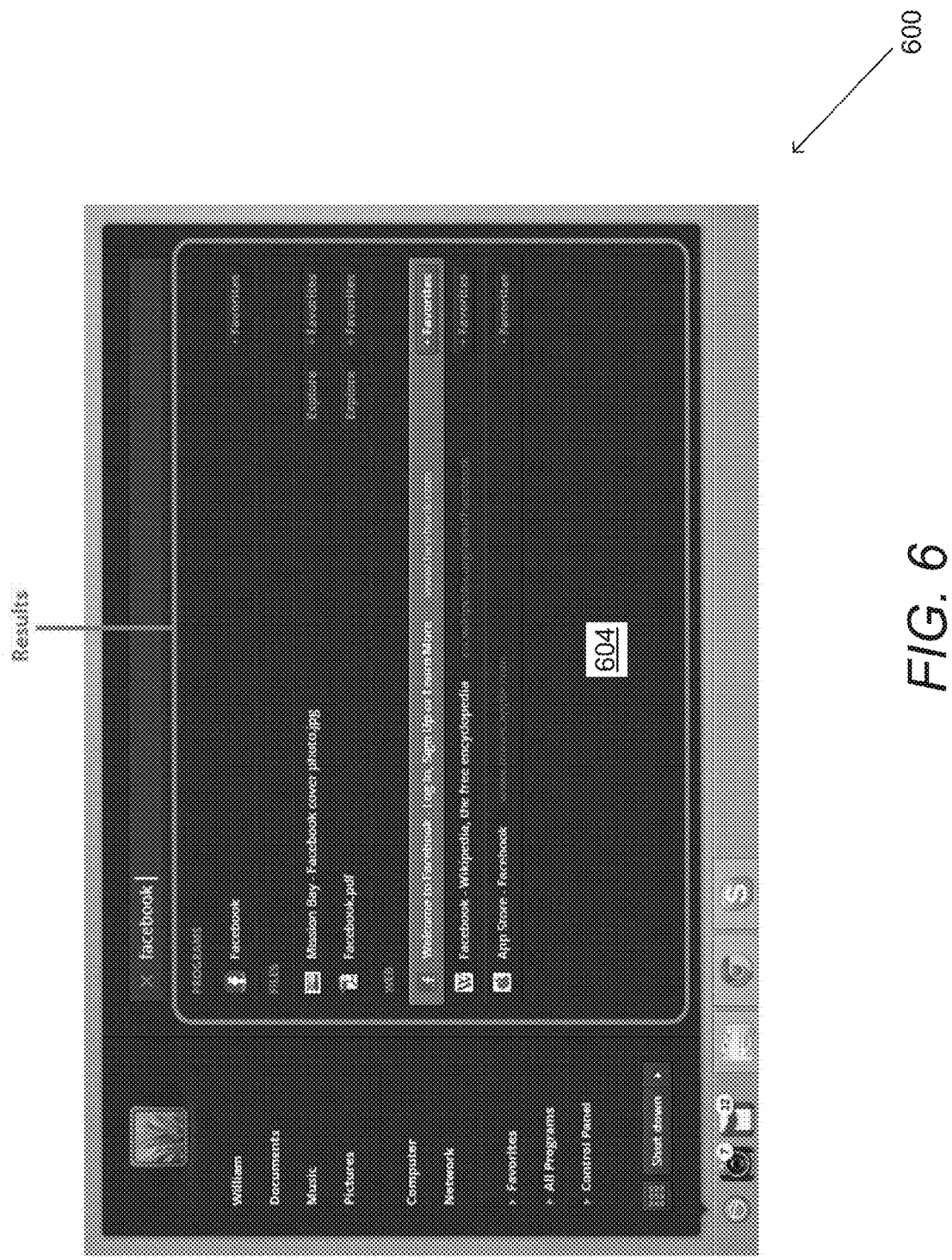
FIG. 6 is a screenshot of search results rendered within the user interface of an application platform application in accordance with an embodiment of the invention.

In the illustrated embodiment, a user interface mechanism is provided to receive a search query. Based upon a received search query, searches can be implemented in accordance with many embodiments of the invention in which the search outputs can be configured to be organized in an intuitive fashion. The searches can be provided by utilizing a search application's API or performed by the application platform application itself. In certain embodiments, the search outputs can be organized by file type, location of search output, or by which search engine yielded the search output. In this way, search results related to locally stored information and search results with respect to information that can be retrieved via a network such as (but not limited to) the Internet can be displayed in a single integrated user interface using processes similar to those outlined above with respect to FIG. 4. Also, functions and/or configurations can be injected into search output such as where a user can quickly add applications found as part of a search result to a favorite applications list. A screenshot of search results rendered within the user interface of an application platform application in accordance with an embodiment of the invention is illustrated in FIG. 6. The screenshot 600 includes search results 604 from a search of the term "facebook", which yields results organized by whether the result is an application, file or information retrievable via the Internet.

Figure 7:
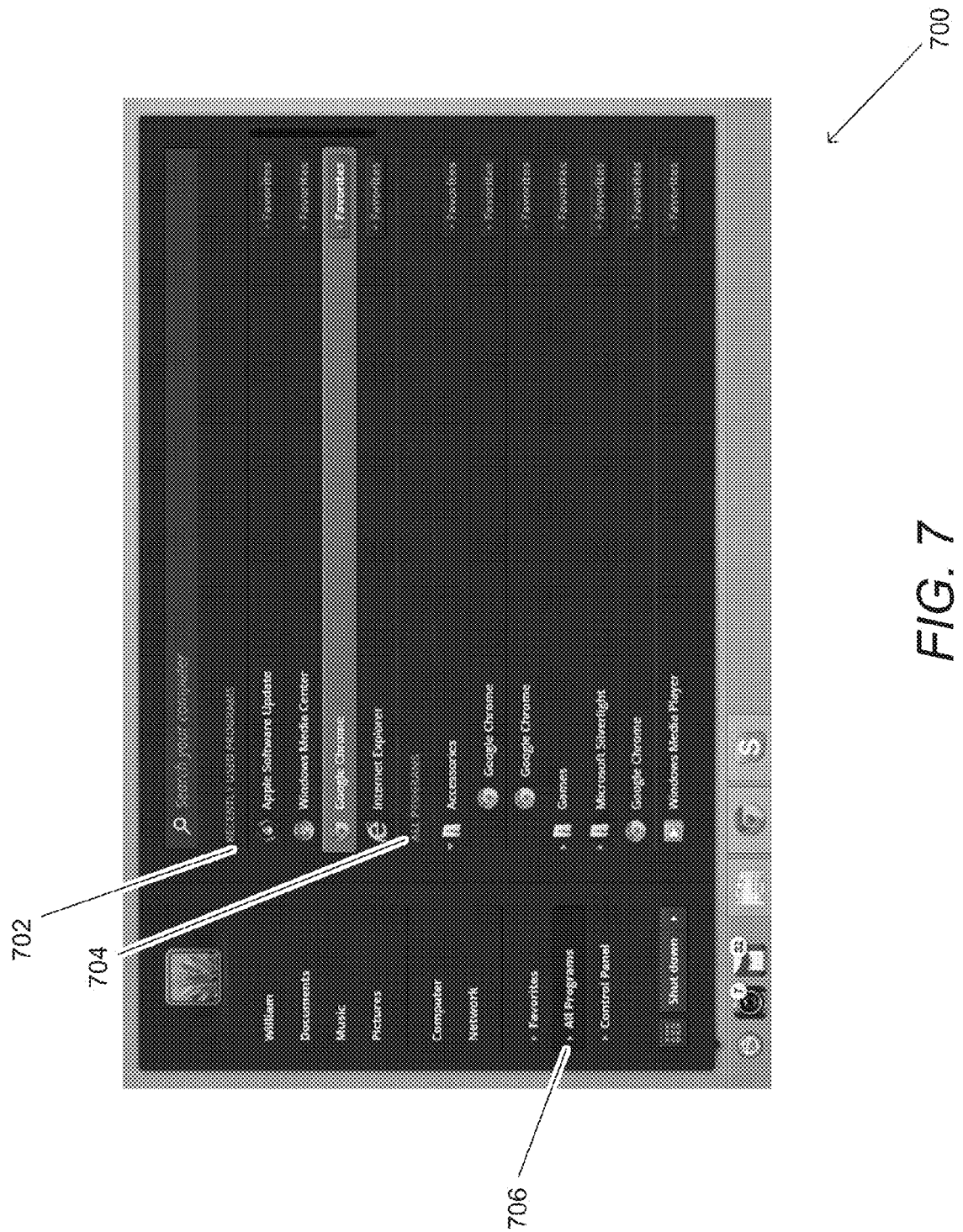
FIG. 7 is a screenshot where a list of applications is rendered within the user interface of an application platform application in accordance with an embodiment of the invention.

In many embodiments, an integrated application platform application can present a list of all applications available to the user, including both natively implementable and non-natively implementable applications. Additionally, the list of applications can be personalized, such as where most recently used applications or most used applications are also presented. This list of applications can be found as stored within a directory on the local computing device accessible by the integrated application platform application or from a search of the local computing device. A screenshot where a list of applications is displayed within the user interface of an application platform application in accordance with an embodiment of the invention is illustrated in FIG. 7. The screenshot 700 illustrates how when "All Programs" 706 is selected, the user interface presents a list of applications divided into a list of recently used applications 702 and all applications 704.

In several embodiments, local computing device functions and/or configurations can be accessed via the user interface of the local computing device. These local computing device functions and/or configurations can affect basic functions and/or configurations of the local computing device, such as the display of the date and time or the resolution of the display of the local computing device. In certain embodiments, these local computing device functions and/or configurations are accessible from a directory or from a search for local computing device functions and/or configurations.

Figure 8:
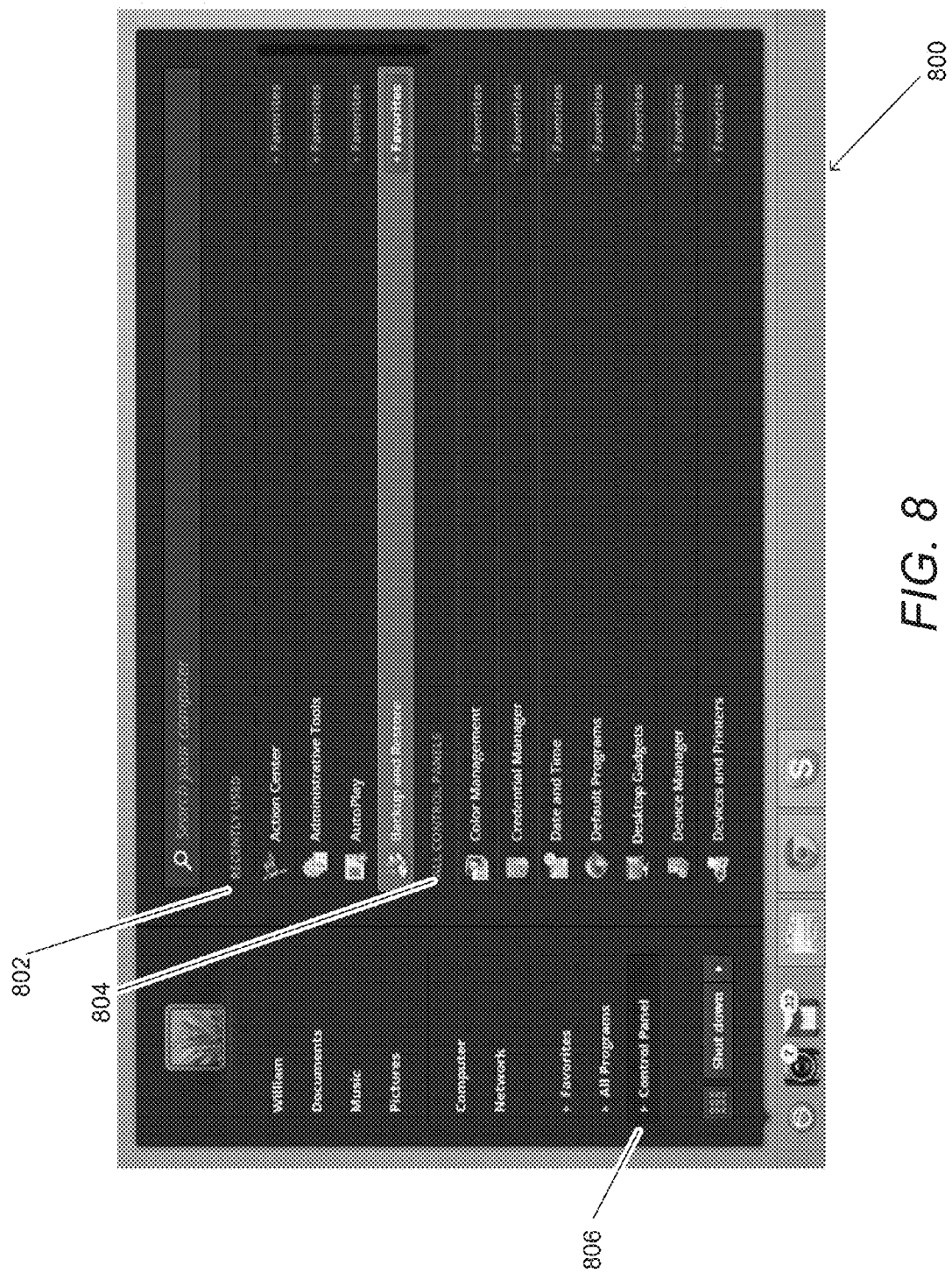
FIG. 8 is a screenshot where a list of local computing device functions and/or configurations from a directory entitled "Control Panel" is rendered within the user interface of a computer device by an integrated application platform application in accordance with an embodiment of the invention.

A screenshot showing a list of local computing device functions and/or configurations found under a directory labeled "Control Panel" within the computing environment created by the operating system of the local computing device in accordance with an embodiment of the invention is illustrated in FIG. 8. The screenshot 800 illustrates how a list of local computing device functions and/or configurations are presented when the "Control Panel" 806 option is selected via a user interface generated by an integrated application platform application in accordance with embodiments of the invention. The local computing device functions and/or configurations are listed in two categories. The first category is a list in order of recently used local computing device functions and/or configurations 802. The second category lists all local computing device functions and/or configurations found under the "Control Panel" directory 804. The specific functions and/or configurations that can be accessed and/or modified via the integrated application platform application user interface can be discovered in the manner outlined above and are not limited to the specific functions and/or configurations shown in the illustrated screen shot. Indeed, any function and/or configuration that can be accessed via a computing environment provided by an operating system on a local computing device can be accessed via a user interface created by an integrated computing platform in accordance with embodiments of the invention.

Although specific screen shots showing implementations of user interfaces that can be generated by integrated application platforms are discussed above with reference to FIGS. 5-8, application platforms can utilize any user interface in any manner appropriate to the requirements of a specific application in accordance with embodiments of the invention. Specific implementations of integrated application platforms in accordance with embodiments of the invention are described below.

Integrated Application Platforms

In several embodiments, non-native applications capable of executing within a runtime environment provided by an integrated application platform application include cross-platform applications implemented using web technologies including but not limited to HTML, JavaScript, and/or CSSs. An integrated application platform application capable of providing a runtime environment for cross-platform applications can be implemented using the combination of a rendering engine layer and an integration layer. The rendering engine layer is able to perform all of the functions of the rendering engine of a web browser, enabling execution of cross-platform applications implemented using web technologies in a similar way to the manner in which web applications execute within a web browser application, i.e. without the need for a user to launch a web browser application. In a number of embodiments, the rendering engine layer includes various parsers and virtual machines associated with supporting specific web technologies including but not limited to HTML, JavaScript, and CSS. The rendering engine layer of an integrated application platform application can interpret a cross-platform application in a manner similar to the manner in which the rendering engine of a web browser enables the execution of a web application. Indeed, many embodiments of the invention utilize a modified version of a rendering engine developed for use in a web browser. For example, a modified version of the WebKit or WebKit2 rendering engines can be used to implement a rendering engine layer in accordance with an embodiment of the invention.

Cross-platform applications are, however, not constrained in the way that web applications are typically constrained to specific web browser instances. The integration layer enables the integration of the cross-platform application with the user's desktop computing environment and communication with natively implemented processes to provide functionality including (but not limited to) desktop launch points and alerts based upon data pulled from remote servers by the cross-platform application. In many embodiments, an integration layer serves to enable a cross-platform application developed using web technologies to behave within the computing environment as if it is a conventional desktop (e.g. a native) application. In several embodiments, the integration layer exposes a number of APIs that can be called by a cross-platform application to make modifications to a user's computing environment including APIs that enable the cross-platform application to provide information to the integrated application platform that the integrated application platform application can use to display alerts. In several embodiments, the integration layer APIs are JavaScript APIs that can be called by the various cross-platform applications running within the application runtime environment created by the integrated application platform. In response to the API calls the integration layer can communicate with the operating system and/or natively implemented processes to retrieve information from and modify the user's computing environment. In several embodiments, the operating system provides APIs that enable searching and/or exploration of the local file system.

In many embodiments, an integrated application platform application enables the integration of cross-platform applications into the computing environment of a user device by exposing a number of APIs that can be called to make modifications to a user's computing environment and/or communicate with operating system processes (or other native processes). In the context of a personal computer, a user's computing environment can include an integrated application platform application installed on a personal computer that enables cross-platform applications to modify the desktop computing environment. Integrated application platforms can also be implemented for installation on other classes of device such as (but not limited to) mobile phones, tablet computers, game consoles, Internet connected televisions and/or consumer electronics devices that do not utilize desktop computing environments.

In numerous embodiments, each cross-platform application is continuously active and can continuously communicate with remote servers via a network such as the Internet to obtain additional information for alerts when the integrated application platform application is running. Utilizing the integration with the user's computing environment provided by the integrated application platform, cross-platform applications can continuously provide alerts based upon information retrieved from the remote servers. In this way, the cross-platform applications can be used to extend web applications and web services to a user's computing environment. In a number of embodiments, the cross-platform applications are configured to provide continuous alerts without continuously communicating with remote servers. Cross-platform applications can be configured to provide alerts regarding data located on the user's computing environment on which the integrated application platform is running. Similarly, cross-platform applications can retrieve and store data from remote servers and continuously provide alerts based on the stored data.

A desktop computing environment typically includes desktop shortcuts, favorites, taskbar icons, and/or a start menu that facilitates functions including but not limited to the launching of desktop applications and the provision of alerts by desktop applications. In many embodiments, an integrated application platform application enables a cross-platform application to behave within the computing environment as if it is a conventional natively implemented desktop application. For example, an integrated application platform application can enable icons for cross-platform applications to be included in the task bar and/or the start menu of the computing environment. The integrated application platform application can also apply badges or alerts to the icons. In many embodiments, the integrated application platform application also enables a cross-platform application to create desktop shortcuts to launch the cross-platform application and can provide shell support for the cross-platform application enabling the cross-platform application or a web application associated with the cross-platform application to be associated with specific file types. In several embodiments, the cross-platform application is able to behave as if it is a conventional natively implemented desktop application, because the integrated application platform application provides mechanisms by which the cross-platform application can communicate with operating system processes and/or other natively implemented processes. As outlined above, the integrated application platform application can also provide launch points for natively implemented applications within user interfaces generated by the integrated application platform.

In various embodiments, when a cross-platform application is implemented using the same technologies that are utilized to implement web applications, a cross-platform application can be implemented using a background page that contains all of the logic of the cross-platform application. As with a conventional web page, the background page is a text file (as opposed to a binary executable) that can include HTML, JavaScript and/or CSS that the rendering engine layer of the integrated application platform application parses to implement the logic contained therein in a similar fashion to the way in which the rendering engine of a web browser application parses a conventional web page when enabling a web application on a user device. In many embodiments, the background pages are not rendered to a display attached to the computing device and configured to display cross-platform application content.

In addition to a background page, the cross-platform application can also include one or more pop-up (e.g. window) pages that are similar to a conventional web page and can be displayed to the user to implement alerts and/or a user interface. In many embodiments, a cross-platform application includes a background page and at least one pop-up page that are stored on the computing device. The integrated application platform application process implements the logic contained within the background page and can provide a user interface and/or alerts via various pop-up pages. In several embodiments, the background page retrieves information from remote server systems and generates alerts via API calls to the integrated application platform application in response to the retrieved information. In a variety of embodiments, the pop-up pages include logic similar to the background pages and the pop-up pages cease to execute the logic when they are not running. In many embodiments, the cross-platform applications provide content including (but not limited to) audio, video, images and/or text to the integrated application platform, which uses the content to generate alert pop-up pages. In several embodiments, the cross-platform applications provide instructions in a scripting language such as (but not limited to) JavaScript that the integrated application platform application uses to determine the manner in which a user can interact with the alert pop-up pages (e.g. responses to mouse overs, and/or selections). APIs exposed by the integrated application platform application enable logic within either the background page or the pop-up page to modify and respond to interactions with launch points such as (but not limited to) icons within the user's computing environment. For example, the APIs can enable any of the pages associated with the cross-platform application to provide alerts by responding to an alert request from a user hovering over or clicking on the cross-platform application's icon by displaying recent alerts associated with that cross-platform application or certain alerts across all applications.

While each of the pages associated with a cross-platform application are processed by the integrated application platform application independently and do not necessarily share Document Object Model (DOM) or JavaScript contexts, the pages can communicate with each other using a Remote Procedure Call (RPC) method included in the integrated application platform application APIs, and share data using unified local storage. This allows for a reduction in duplicate data transferring and processing, and may be used to enhance cross-platform application performance by caching data.

Although specific implementations of integrated application platforms are discussed above, integrated application platforms can be configured in any manner as appropriate to a specific application in embodiments of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device configured to execute an application platform application, comprising:
 a processor;
 storage storing the application platform application and index; and
 an operating system stored within the storage, where the operating system configures the processor to create a computing environment;
 wherein the application platform application is at least partially natively implemented and creates an application runtime environment for cross-platform applications to execute non-natively on the computing device when executed within the computing environment by the computing device, the application platform application comprising:
 a rendering engine process configured to:
 render pages within the computing environment created by the operating system by interpreting instructions written in a rendering language; and
 implement a virtual machine configured to execute instructions written in a scripting language; and
 an integration process that enables instructions executing within the virtual machine to launch natively implemented applications within the computing environment;
 wherein the application platform application comprises a pop up page file containing instructions written in the rendering language that cause the rendering engine process to render a pop up page within the computing environment of the computing device;
 wherein the application platform application is configured to integrate at least one cross-platform application into the computing environment of the computing device by providing at least one launch point for the at least one cross-platform application within the computing environment using the integration process;
 wherein the rendered pop up page comprises at least one launch point for a non-natively implemented application and at least one launch point for a natively implemented application obtained using the index, where the index is generated based on the storage of the computing device;
 wherein the application platform application is configured to launch a natively implemented application using the integration process in response to a user instruction received via interaction with the rendered pop up page; and
 wherein the application platform application is configured to launch a non-natively implemented application using the integration process in response to a user instruction received via interaction with the rendered pop up page.

2. The computing device of claim 1, wherein:
 the integration process enables instructions executing within the virtual machine to retrieve information from the computing environment of the computing device;
 the application platform application is configured to retrieve information from the computing environment using the integration process in response to a user instruction received via interaction with the rendered pop up page; and
 the application platform application is configured to inject at least a portion of the retrieved information into the instructions written in the rendering language from the pop up page file and cause the rendering engine process to render the pop up page including the at least a portion of the retrieved information.

3. The computing device of claim 2, wherein:
 the retrieved information includes at least one launch point for a specific natively implemented application; and
 the application platform application is configured to launch the specific natively implemented application using the launch point and the integration process in response to a user instruction received via interaction with the rendered pop up page.

4. The computing device of claim 2, wherein the integration process enables instructions executing within the virtual machine to retrieve information from the computing environment of the computing device by providing a query to a search engine within the computing environment.

5. The computing device of claim 4, wherein the search engine is configured to perform a search for information within the storage of the computing device by:

querying the index using metadata that identifies information stored within the storage of the computing device; and retrieving the information stored within the storage of the computing device.

6. The computing device of claim 1, wherein the instructions within the pop up page file further comprise retrieving information from the application runtime environment that is displayed when the pop up page is rendered by the rendering engine process.

7. The computing device of claim 6, wherein:
the information from the application runtime environment includes at least one launch point for a cross-platform application.

8. The computing device of claim 1, wherein the natively implemented application launched by the application platform application is a file manager application that provides a user interface to access and navigate a system of files stored within the storage of the computing device.

9. The computing device of claim 1, wherein the natively implemented application launched by the application platform application is an application that invokes a shutdown process that instructs the computing device's power management hardware to turn off power to the computing device after ending all executing processes running on the computing device.

10. The system of claim 1, wherein the application platform application is configured to scan the computing device to retrieve information related to at least one specific native application installed on the computing device and at least one specific non-native application.

11. The system of claim 1, wherein:
the pop up page further comprises a user interface mechanism to receive a search query; and
the application platform application further:
obtains a search query using the user interface mechanism in the pop up page;
searches the computing device for locally stored information matching the search query;
generates a search output comprising the matching locally stored information; and
presents the search output via the pop up page.

12. A method of executing an application platform application on a computing device, comprising:
creating a computing environment using a processor configured by an operating system on the computing device; and
executing an application platform application within the computing environment to generate a runtime environment for cross-platform applications to execute non-natively on the computing device, the application platform application comprising:
a rendering engine process configured to:
render pages within the computing environment created by the operating system by interpreting instructions written in a rendering language; and
implement a virtual machine configured to execute instructions written in a scripting language; and
an integration process that enables instructions executing within the virtual machine to launch natively implemented applications within the computing environment;
rendering instructions written in the rendering language contained within a pop up page file that is part of the application platform application to create a pop up page within the computing environment of the computing device using the rendering engine process, where the rendered pop up page comprises at least one launch point for a non-natively implemented application and at least one launch point for a natively implemented application obtained using an index, where the index is generated based on a storage of the computing device;
integrating at least one cross-platform application into the computing environment of the computing device by providing at least one launch point for the at least one cross-platform application within the computing environment using the integration process;
launching a natively implemented application using the integration process in response to a user instruction received via interaction with the rendered pop up page; and
launching a non-natively implemented application using the integration process in response to a user instruction received via interaction with the rendered pop up page.

13. The method of claim 12, wherein:
the integration process enables instructions executing within the virtual machine to retrieve information from the computing environment of the computing device; and
the method further comprising:
retrieving information from the computing environment using the integration process in response to a user instruction received via interaction with the rendered pop up page; and
injecting at least a portion of the retrieved information into the instructions written in the rendering language from the pop up page file using the application platform application; and
rendering the pop up page including the at least a portion of the retrieved information using the rendering engine process.

14. The method of claim 13, wherein:
the retrieved information includes at least one launch point for a specific natively implemented application; and
the method further comprises launching the specific natively implemented application using the launch point and the integration process in response to a user instruction received via interaction with the rendered pop up page.

15. The method of claim 14, wherein the natively implemented application launched by the application platform application is a file manager application that provides a user interface to access and navigate a system of files stored within the storage of the computing device.

16. The method of claim 14, wherein the natively implemented application launched by the application platform application is an application that invokes a shutdown process that instructs the computing device's power management hardware to turn off power to the computing device after ending all executing processes running on the computing device.

17. The method of claim 13, wherein the integration process enables instructions executing within the virtual machine to retrieve information from the computing environment of the computing device by providing a query to a search engine within the computing environment.

18. The method of claim 17, further comprising searching for information within the storage of the computing device using the search engine by:
querying the index using metadata that identifies information stored within the storage of the computing device; and
retrieving the information stored within the storage of the computing device.

19. The method of claim 12, further comprising retrieving information from the application runtime environment that is displayed when the pop up page is rendered by the rendering engine process by executing executable instructions within the pop up page file within the virtual machine.

20. The method of claim 19, wherein:

the information from the application runtime environment includes at least one launch point for a cross-platform application.

21. A non-transitory machine readable medium containing processor instructions, where execution of the instructions by a processor causes the processor to perform a process comprising:

creating a computing environment; and generating a runtime environment for cross-platform applications to execute non-natively, the application platform application comprising:

a rendering engine process configured to:

render pages within the computing environment created by the operating system by interpreting instructions written in a rendering language; and implement a virtual machine configured to execute instructions written in a scripting language; and an integration process that enables instructions executing within the virtual machine to launch natively implemented applications within the computing environment;

rendering instructions written in the rendering language contained within a pop up page file to create a pop up page within the computing environment using the rendering engine process, where the rendered pop up page comprises at least one launch point for a non-natively implemented application and at least one launch point for a natively implemented application obtained using an index, where the index is generated based on a storage of the computing device;

integrating at least one cross-platform application into the computing environment of the computing device by providing at least one launch point for the at least one cross-platform application within the computing environment using the integration process;

launching a natively implemented application using the integration process in response to a user instruction received via interaction with the rendered pop up page; and launching a non-natively implemented application using the integration process in response to a user instruction received via interaction with the rendered pop up page.

* * * * *